US011956862B2

(12) United States Patent
Wensley

(10) Patent No.: US 11,956,862 B2
(45) Date of Patent: Apr. 9, 2024

(54) ELECTRONIC CIGARETTE WICK

(71) Applicant: FONTEM HOLDINGS 1 B.V., Amsterdam (NL)

(72) Inventor: Martin Wensley, Los Gatos, CA (US)

(73) Assignee: Fontem Ventures B.V., Amsterdam (NL)

( * ) Notice: Subject to any disclaimer, the term of this patent is extended or adjusted under 35 U.S.C. 154(b) by 383 days.

(21) Appl. No.: 17/319,616

(22) Filed: May 13, 2021

(65) Prior Publication Data

US 2021/0378059 A1 Dec. 2, 2021

Related U.S. Application Data

(63) Continuation of application No. 15/995,734, filed on Jun. 1, 2018, now Pat. No. 11,013,270.

(60) Provisional application No. 62/514,575, filed on Jun. 2, 2017.

(51) Int. Cl.

| | |
|---|---|
| ***A24F 47/00*** | (2020.01) |
| ***A24F 40/44*** | (2020.01) |
| ***A24F 40/46*** | (2020.01) |
| ***B05B 17/06*** | (2006.01) |
| ***H05B 3/04*** | (2006.01) |
| ***H05B 3/44*** | (2006.01) |
| *A24F 40/10* | (2020.01) |

(52) U.S. Cl.

CPC ............... *H05B 3/04* (2013.01); *A24F 40/44* (2020.01); *A24F 40/46* (2020.01); *B05B 17/0684* (2013.01); *H05B 3/44* (2013.01); *A24F 40/10* (2020.01); *H05B 2203/014* (2013.01); *H05B 2203/021* (2013.01); *H05B 2203/022* (2013.01)

(58) Field of Classification Search

CPC ........................................................ A24F 40/44

See application file for complete search history.

(56) References Cited

U.S. PATENT DOCUMENTS

2003/0052114 A1 3/2003 Ek et al.
2008/0245305 A1* 10/2008 Ikarashi ................ C23C 14/243 392/303
2009/0120924 A1 5/2009 Moffatt
2011/0226236 A1 9/2011 Buchberger
2013/0056013 A1* 3/2013 Terry .................. A61M 11/041 131/328
2013/0192615 A1 8/2013 Tucker
2014/0000638 A1 1/2014 Sebastian et al.
2014/0060554 A1 3/2014 Collett
2014/0238424 A1 8/2014 Macko et al.
2015/0164147 A1 6/2015 Verleur et al.
2015/0320116 A1 11/2015 Bleloch et al.
(Continued)

FOREIGN PATENT DOCUMENTS

DE 102012002044 A1 8/2013
WO 2014153515 A1 9/2014

*Primary Examiner* — Eric Yaary
(74) *Attorney, Agent, or Firm* — Dykema Gossett PLLC

(57) ABSTRACT

Various aspects of the present disclosure are directed to an electronic cigarette with improved aerosol delivery characteristics. For example, an electronic cigarette consistent with the present disclosure may include a wick capable of enhanced delivery of electronic cigarette juice to a heating element. In particular, the wick may be a stainless-steel, wire mesh. In some specific embodiments, the wick may be coated to improve its electrically insulative characteristics.

14 Claims, 5 Drawing Sheets

(56) References Cited

U.S. PATENT DOCUMENTS

| | | | |
|---|---|---|---|
| 2017/0112193 | A1 | 4/2017 | Chen |
| 2017/0164656 | A1 | 6/2017 | Eusepi |
| 2017/0188628 | A1 | 7/2017 | Montgomery |
| 2017/0367409 | A1 | 12/2017 | Thorens |
| 2018/0042301 | A1 | 2/2018 | Rostami |
| 2018/0177240 | A1 | 6/2018 | Duque |

* cited by examiner

ELECTRONIC CIGARETTE WICK

CROSS-REFERENCE TO RELATED APPLICATIONS

This application is a continuation of U.S. patent application Ser. No. 15/995,734, filed 1 Jun. 2018, which claims the benefit of U.S. provisional application 62/514,575, filed 2 Jun. 2017, both of which are hereby incorporated by reference as though fully set forth herein.

FIELD OF INVENTION

The present invention relates generally to electronic smoking devices and in particular electronic cigarettes.

BACKGROUND OF THE INVENTION

An electronic smoking device, such as an electronic cigarette (e-cigarette), typically has a housing accommodating an electric power source (e.g., a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

Many electronic cigarettes deliver electronic cigarette juice from a reservoir to an atomizer via a combustible wick (via capillary effect); however, when the electronic cigarette is operated when the wick is inadequately saturated (e.g., when the atomizer's demand for juice exceeds the delivery rate of the wick), the wick may overheat and begin to combust. Combustion of the wick will result in an undesirable taste—thereby degrading the user's experience. Moreover, wick combustion may reduce the useable life of the electronic cigarette, and/or further reduce a maximum flow rate of the wick leading to subsequent wick overheating events and further device degradation.

The foregoing discussion is intended only to illustrate the present field and should not be taken as a disavowal of claim scope.

SUMMARY OF THE INVENTION

Aspects of the present disclosure are directed to an electronic cigarette including an enhanced wick that delivers electronic cigarette juice from a reservoir to an atomizer for vaporization and inhalation by a user.

Aspects of the present disclosure are directed to an electronic cigarette including a tank, atomizer, and non-combustible wick. The tank contains eCig juice, and the atomizer includes a heating element. The atomizer vaporizes eCig juice into an airflow. The wick is positioned in fluid communication between the tank and the atomizer, and draws eCig juice from the tank and deposits the eCig juice on to the heating element.

Some embodiments of the present disclosure are directed to a wick for an electronic cigarette including a non-combustible internal composition and a non-conductive coating.

In accordance with various embodiments of the present disclosure an electronic cigarette is disclosed including a non-combustible wick that delivers electronic cigarette juice from a reservoir to an atomizer coil. In particular, embodiments of the present disclosure are directed to electronic cigarettes that incorporate one or more non-combustible wicks for use in vaporizing or aerosolizing a composition to provide a desired result to a user. In some embodiments, the electronic cigarette may achieve a user experience substantially similar to smoking a conventional cigarette, and/or to achieve delivery of an electronic cigarette juice to the atomizer at a rate that matches a vaporization rate of the atomizer.

In some embodiments, an electronic cigarette is disclosed including a wick formed of a rolled, stainless-steel mesh fluidly coupled between a reservoir and an atomizer coil. Some specific embodiments may include one or more rolled, stainless-steel mesh wicks, where each wick is either longitudinally coupled to the other wicks, or offset therefrom to provide distinct wicks for providing e-cig juice (e.g., one or more varieties of juice) to the same or different atomizer coils.

In specific embodiments, a conductive, mesh wick is disclosed including a non-conductive coating (on either the wick or the atomizer coil) to prevent current draw away from the atomizer coil during vaporization. Various non-conductive coatings are disclosed herein, including a diamond-like carbon, titanium oxide, polyamide, polyparaxylene, among others.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, the same element numbers indicate the same elements in each of the views.

Figure 1:
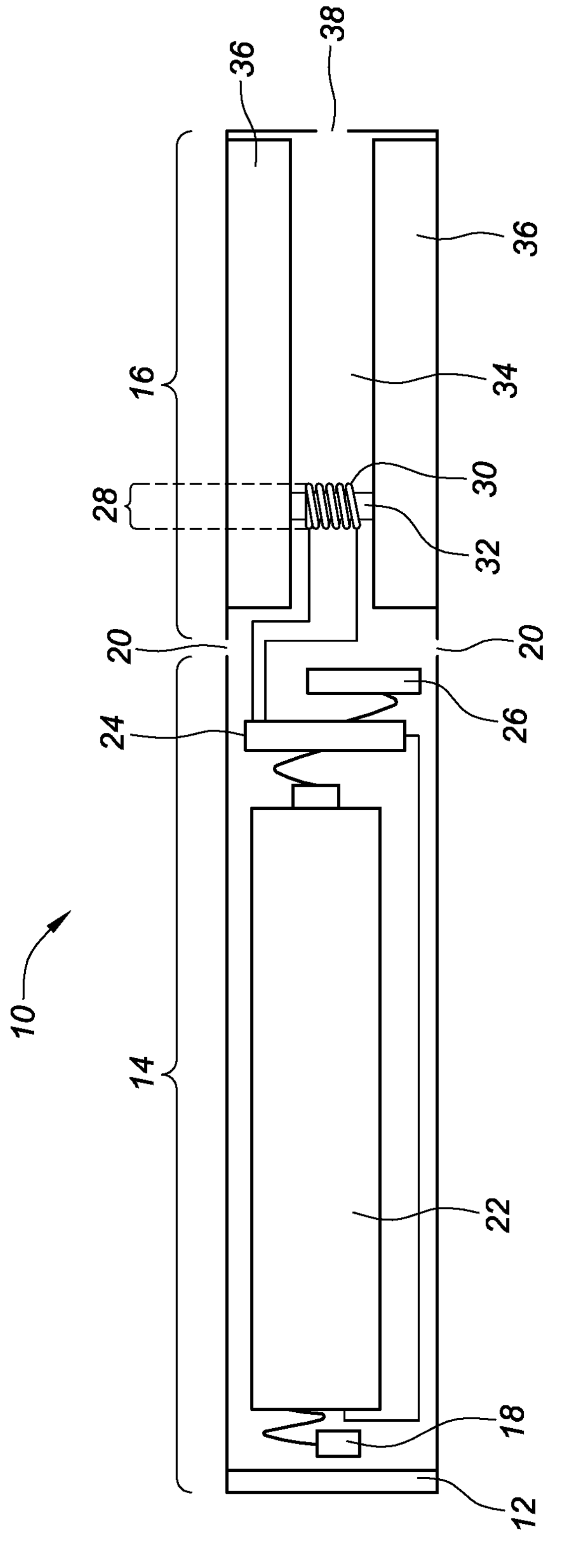
FIG. 1 is a schematic cross-sectional illustration of an exemplary e-cigarette, consistent with various embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DESCRIPTION OF THE PREFERRED EMBODIMENTS

Aspects of the present disclosure are directed to an electronic cigarette including an enhanced wick that delivers electronic cigarette juice from a reservoir to an atomizer; wherein the enhanced wick includes desirable characteristics such as improved electronic cigarette juice flow rates, tolerance to overheating events, and/or an extended operational lifespan.

In accordance with one aspect of the present disclosure, an electronic cigarette is provided including a non-combustible wick that delivers electronic cigarette juice from a reservoir to an atomizer coil. In particular, embodiments of the present disclosure are directed to electronic cigarettes that incorporate one or more non-combustible wicks for use in vaporizing or aerosolizing a composition to provide a desired result to a user. In some embodiments, the electronic cigarette may achieve a user experience substantially similar to smoking a conventional cigarette, and/or to achieve delivery of an electronic cigarette juice to the atomizer at a rate that matches a vaporization rate of the atomizer.

In various embodiments, an electronic cigarette is disclosed including a wick formed of a rolled, stainless-steel mesh fluidly coupled between a reservoir and an atomizer coil. Some specific embodiments may include one or more rolled, stainless-steel mesh wicks, where each wick is either longitudinally coupled to the other wicks, or offset therefrom to provide distinct wicks for providing e-cig juice (e.g., one or more varieties of juice) to the same or different atomizer coils.

In specific embodiments, a conductive mesh wick is disclosed including a non-conductive coating (on either the wick or the atomizer coil) to prevent drawing current away from the atomizer coil during vaporization. This may be particularly desirable for electronic cigarettes that utilize resistance-based atomizer coil temperature control. Various non-conductive coatings are disclosed herein, including a diamond-like carbon, titanium oxide, polyamide, polyparaxylene, among others. Details of the various embodiments of the present disclosure are described below with specific reference to the figures.

Throughout the following, an electronic smoking device will be exemplarily described with reference to an e-cigarette. As is shown in FIG. 1, an e-cigarette 10 typically has a housing comprising a cylindrical hollow tube having an end cap 12. The cylindrical hollow tube may be a single-piece or a multiple-piece tube. In FIG. 1, the cylindrical hollow tube is shown as a two-piece structure having a power supply portion 14 and an atomizer/liquid reservoir portion 16. Together the power supply portion 14 and the atomizer/liquid reservoir portion 16 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 14 and atomizer/liquid reservoir portion 16 are typically made of metal (e.g., steel or aluminum, or of hardwearing plastic) and act together with the end cap 12 to provide a housing to contain the components of the e-cigarette 10. The power supply portion 14 and the atomizer/liquid reservoir portion 16 may be configured to fit together by, for example, a friction push fit, a snap fit, a bayonet attachment, a magnetic fit, or screw threads. The end cap 12 is provided at the front end of the power supply portion 14. The end cap 12 may be made from translucent plastic or other translucent material to allow a light-emitting diode (LED) 18 positioned near the end cap to emit light through the end cap. Alternatively, the end cap may be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 14 and the atomizer/liquid reservoir portion 16. FIG. 1 shows a pair of air inlets 20 provided at the intersection between the power supply portion 14 and the atomizer/liquid reservoir portion 16.

A power supply, preferably a battery 22, the LED 18, control electronics 24 and, optionally, an airflow sensor 26 are provided within the cylindrical hollow tube power supply portion 14. The battery 22 is electrically connected to the control electronics 24, which are electrically connected to the LED 18 and the airflow sensor 26. In this example, the LED 18 is at the front end of the power supply portion 14, adjacent to the end cap 12; and the control electronics 24 and airflow sensor 26 are provided in the central cavity at the other end of the battery 22 adjacent the atomizer/liquid reservoir portion 16.

The airflow sensor 26 acts as a puff detector, detecting a user puffing or sucking on the atomizer/liquid reservoir portion 16 of the e-cigarette 10. The airflow sensor 26 can be any suitable sensor for detecting changes in airflow or air pressure, such as a microphone switch including a deformable membrane which is caused to move by variations in air pressure. Alternatively, the sensor may be, for example, a Hall element or an electro-mechanical sensor.

The control electronics 24 are also connected to an atomizer 28. In the example shown, the atomizer 28 includes a heating coil 30 which is wrapped around a wick 32 extending across a central passage 34 of the atomizer/liquid reservoir portion 16. The central passage 34 may, for example, be defined by one or more walls of the liquid reservoir and/or one or more walls of the atomizer/liquid reservoir portion 16 of the e-cigarette 10. The coil 30 may be positioned anywhere in the atomizer 28 and may be transverse or parallel to a longitudinal axis of a cylindrical liquid reservoir 36. The wick 32 and heating coil 30 do not completely block the central passage 34. Rather an air gap is provided on either side of the heating coil 30 enabling air to flow past the heating coil 30 and the wick 32. The atomizer may alternatively use other forms of heating elements, such as ceramic heaters, or fiber or mesh material heaters. Nonresistance heating elements such as sonic, piezo, and jet spray may also be used in the atomizer in place of the heating coil.

The central passage 34 is surrounded by the cylindrical liquid reservoir 36 with the ends of the wick 32 abutting or extending into the liquid reservoir 36. The wick 32 may be a porous material such as a bundle of fiberglass fibers or cotton or bamboo yarn, with liquid in the liquid reservoir 36 drawn by capillary action from the ends of the wick 32 towards the central portion of the wick 32 encircled by the heating coil 30.

The liquid reservoir 36 may alternatively include wadding (not shown in FIG. 1) soaked in liquid which encircles the central passage 34 with the ends of the wick 32 abutting the wadding. In other embodiments, the liquid reservoir may comprise a toroidal cavity arranged to be filled with liquid and with the ends of the wick 32 extending into the toroidal cavity.

An air inhalation port 38 is provided at the back end of the atomizer/liquid reservoir portion 16 remote from the end cap 12. The inhalation port 38 may be formed from the cylindrical hollow tube atomizer/liquid reservoir portion 16 or may be formed in an end cap.

In use, a user sucks on the e-cigarette 10. This causes air to be drawn into the e-cigarette 10 via one or more air inlets, such as air inlets 20, and to be drawn through the central passage 34 towards the air inhalation port 38. The change in air pressure which arises is detected by the airflow sensor 26, which generates an electrical signal that is passed to the control electronics 24. In response to the signal, the control electronics 24 activate the heating coil 30, which causes liquid present in the wick 32 to be vaporized creating an aerosol (which may comprise gaseous and liquid components) within the central passage 34. As the user continues to suck on the e-cigarette 10, this aerosol is drawn through the central passage 34 and inhaled by the user. At the same time, the control electronics 24 also activate the LED 18 causing the LED 18 to light up, which is visible via the translucent end cap 12. Activation of the LED may mimic the appearance of a glowing ember at the end of a conventional cigarette. As liquid present in the wick 32 is converted into an aerosol, more liquid is drawn into the wick 32 from the liquid reservoir 36 by capillary action and thus is available to be converted into an aerosol through subsequent activation of the heating coil 30.

Some e-cigarette are intended to be disposable and the electric power in the battery 22 is intended to be sufficient to vaporize the liquid contained within the liquid reservoir 36, after which the e-cigarette 10 is thrown away. In other embodiments, the battery 22 is rechargeable and the liquid reservoir 36 is refillable. In the cases where the liquid reservoir 36 is a toroidal cavity, this may be achieved by refilling the liquid reservoir 36 via a refill port (not shown in FIG. 1). In other embodiments, the atomizer/liquid reservoir portion 16 of the e-cigarette 10 is detachable from the power supply portion 14 and a new atomizer/liquid reservoir portion 16 can be fitted with a new liquid reservoir 36 thereby replenishing the supply of liquid. In some cases, replacing the liquid reservoir 36 may involve replacement of the heating coil 30 and the wick 32 along with the replacement of the liquid reservoir 36. A replaceable unit comprising the atomizer 28 and the liquid reservoir 36 may be referred to as a cartomizer.

The new liquid reservoir may be in the form of a cartridge (not shown in FIG. 1) defining a passage (or multiple passages) through which a user inhales aerosol. In other embodiments, the aerosol may flow around the exterior of the cartridge to the air inhalation port 38.

Of course, in addition to the above description of the structure and function of a typical e-cigarette 10, variations also exist. For example, the LED 18 may be omitted. The airflow sensor 26 may be placed, for example, adjacent to the end cap 12 rather than in the middle of the e-cigarette. The airflow sensor 26 may be replaced by, or supplemented with, a switch which enables a user to activate the e-cigarette manually rather than in response to the detection of a change in air flow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater.

Figure 2:
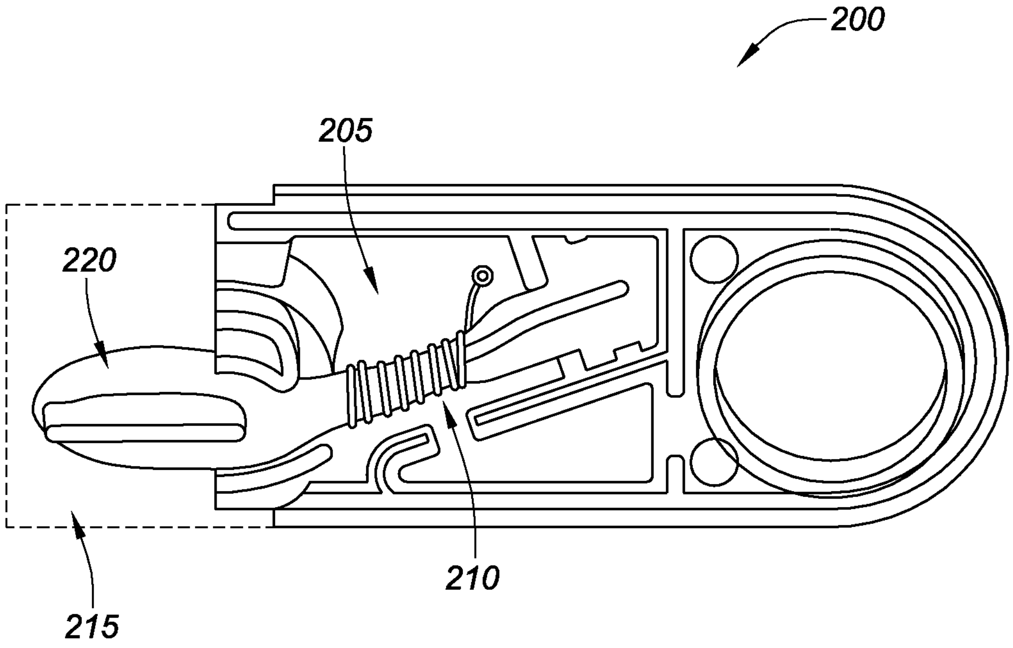
FIG. 2 is a cross-sectional side view of a partial electronic cigarette assembly, consistent with various embodiments of the present disclosure.

FIG. 2 is a cross-sectional side view of a partial electronic cigarette assembly 200. The partial electronic cigarette assembly 200 of FIG. 2 includes an atomizing chamber 205 which facilitates the flow of a user's draw around/through a heating coil 210. Embodiments disclosed herein include a heating coil that is titanium or a composition of alloys including titanium. The heating coil 210 is wetted (using capillary action) with electronic cigarette juice via a metal, mesh wick 220 that draws the juice from a reservoir 215. The coil 210 is fluidly coupled to the reservoir 215 containing the juice via the wick 220. Specific/experimental embodiments disclosed herein include a stainless-steel, mesh wick rolled to form a mesh tube.

As shown in FIG. 2, a wick 220 and heating coil 210 are coupled to one another to facilitate fluid communication, and transportation of electronic cigarette juice therebetween. Where both the wick 220 and heating coil 210 are conductive—e.g., where the heating coil is titanium and the wick is stainless steel, for example—the heating coil when driven by a current may short circuit to the wick negatively impacting vaporization of the juice on the coil, and draining battery life. Moreover, many electronic cigarettes now utilize a resistance measurement of the heating coil during vaporization to facilitate heater coil temperature control. Without isolating the heater coil from the wick, the resistance measurement across the coil would be inaccurate. Accordingly, it is desirable to have the heater coil and wick fluidly coupled, but electrically isolated from one another. To electrically isolate the heater coil from the wick, either the heater coil and/or wick may be coated with an insulative material. In various embodiments, the heating coil and/or wick may be coated with: diamond-like carbon (a class of amorphous carbon material that exhibits some of the typical properties of diamond), titanium dioxide, polyamides, polyparaxylene, among other electrically insulative materials. These coatings may be deposited using known techniques—for example, diamond-like carbon may be deposited using vapor deposition coating techniques.

In yet other embodiments, a heating coil and/or wick of an electronic cigarette may be insulated by forming an aluminum-oxide coating on an aluminum heating coil/wick, or forming a titanium-oxide coating on a titanium coil/wick. Both aluminum-oxide and titanium-oxide have electrically insulative characteristics.

Testing, the results of which are presented below in the Specific/Experimental Results section, have verified that steel, mesh wicks as disclosed herein are capable of juice flow rates desired for electronic cigarette applications. Preferred embodiments of the steel, mesh wicks may include: stainless-steel alloys, and/or titanium (or a metal alloy including titanium). Similarly, the heating coil material may include titanium (or a metal alloy including titanium). Mesh wicks and/or heating coils coated with diamond-like carbon may be preferred in some embodiments for diamond-like carbon's ability to maintain its electrically insulative characteristics in response to the temperature cycling of the heating coil. In yet other embodiments, the wick/coil may comprise copper or a metal alloy including copper.

A wick for an electronic cigarette application may be compromised from titanium. In one specific embodiment, the wick may be a titanium mesh made of titanium grade 1, with a wire diameter of 0.01" (50 SWG), and 500 holes-per-inch. It has been discovered that smaller pore sizes within the mesh create increased capillary force. In yet another embodiment, the wick may be a titanium mesh made of titanium grade 1, a wire diameter of 0.02" (25 SWG), and 100 holes-per-inch.

Specific/Experimental Embodiments

It has been discovered, through testing, that a stainless-steel, mesh wick with a diamond-like carbon insulative coating produces desirable capillary action for electronic cigarette applications.

Figure 3:
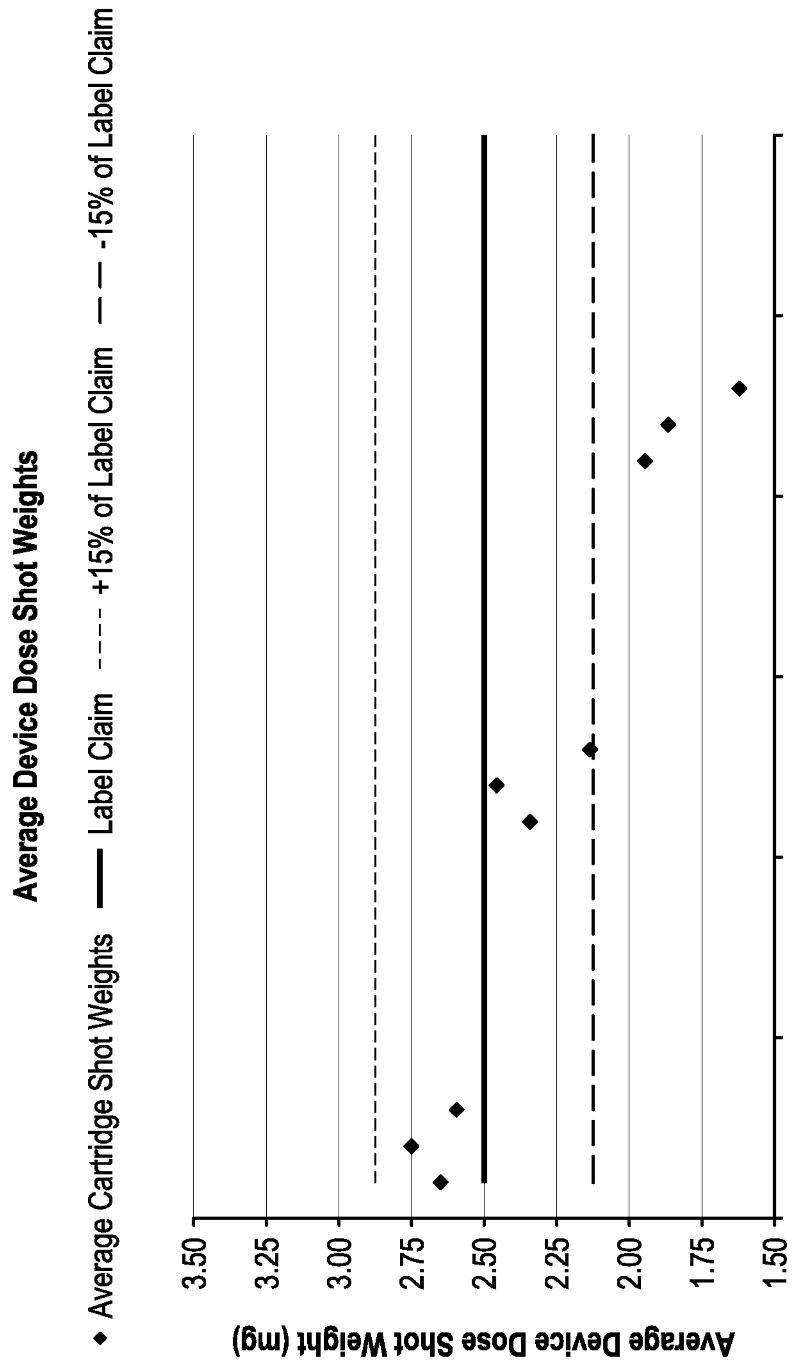
FIG. 3 is a graph showing the average device dose shot weights for one experimental embodiment, consistent with various embodiments of the present disclosure.

To test the efficacy of a stainless-steel, mesh wick with diamond-like carbon coating in an electronic cigarette application, three test devices (see also, FIG. 2) were built with a wick extending between an electronic cigarette juice reservoir and an atomizer coil (also referred to herein as a heating coil). As shown in FIG. 3, below, the three test devices were able to meet the specifications for a typical dosage label claim deviation of ±15%. For the purposes of testing, the dosage label claim was 2.5 milligrams (mg). The maximum and minimum allowable dosages falling between approximately 2.875 mg and 2.125 mg. Each of the data points indicates an average device dose shot weight in milligrams—with each of the three groupings representative of a particular test device. The sample size for each of the test devices was 3 draws. While the device-to-device deviation was high—±15% Cp=0.32 (where Cp is the process capability index)—this deviation is likely associated with the devices being one-off prototypes.

Figure 4:
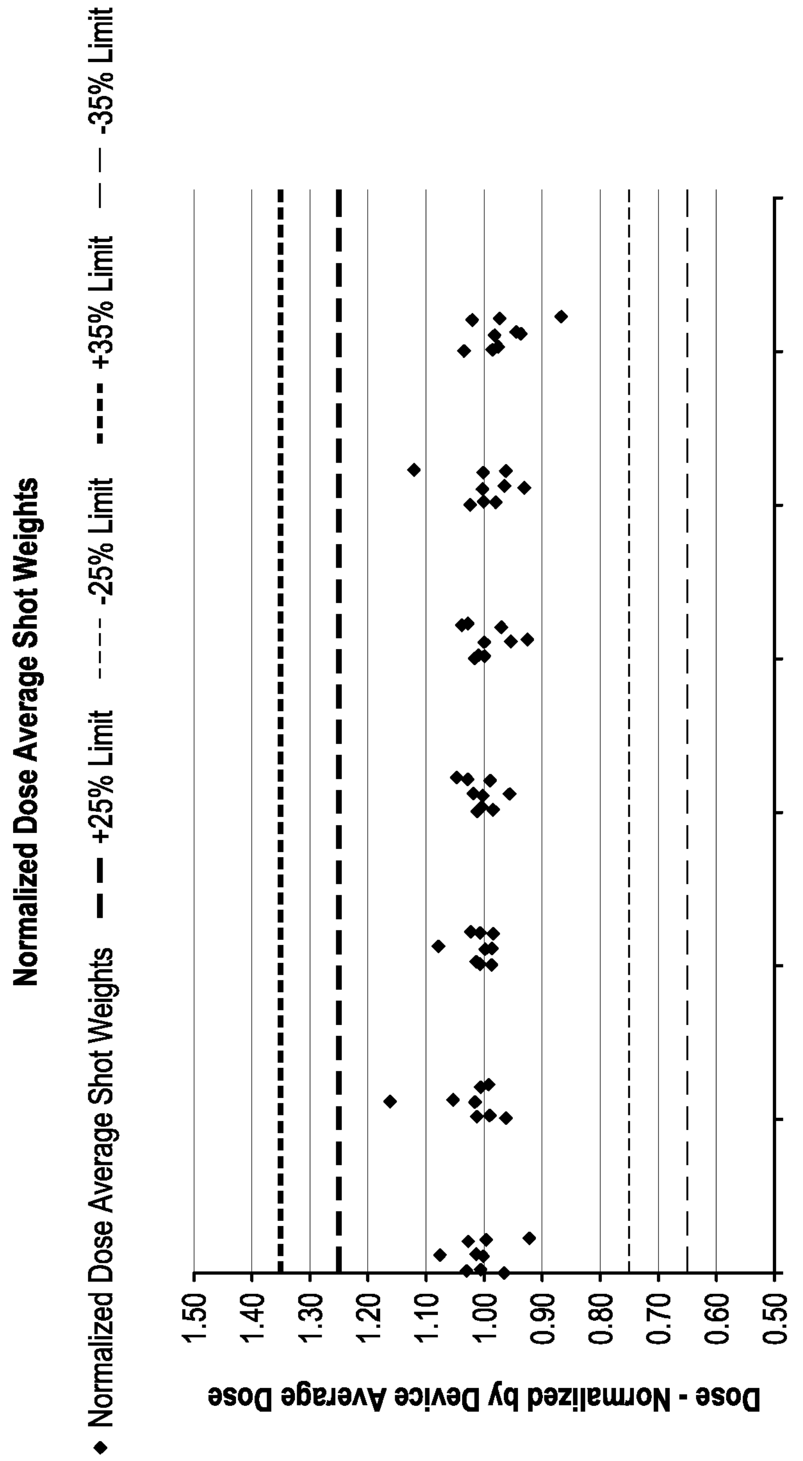
FIG. 4 is a graph showing the normalized dose average shot weights for the one experimental embodiment, consistent with various embodiments of the present disclosure.

FIG. 4 shows a normalised dose average shot weight distribution of the three test devices, where the intended dose is 1.00 mg. The ±25% limit is 1.25 mg, and 0.75 mg, respectively; while the ±35% limit is 1.35 mg, and 0.65 mg, respectively. The ±25% Cp=2.06—indicating a high likelihood that the test devices are capable of regularly producing shot weights within specification limits.

Figure 5:
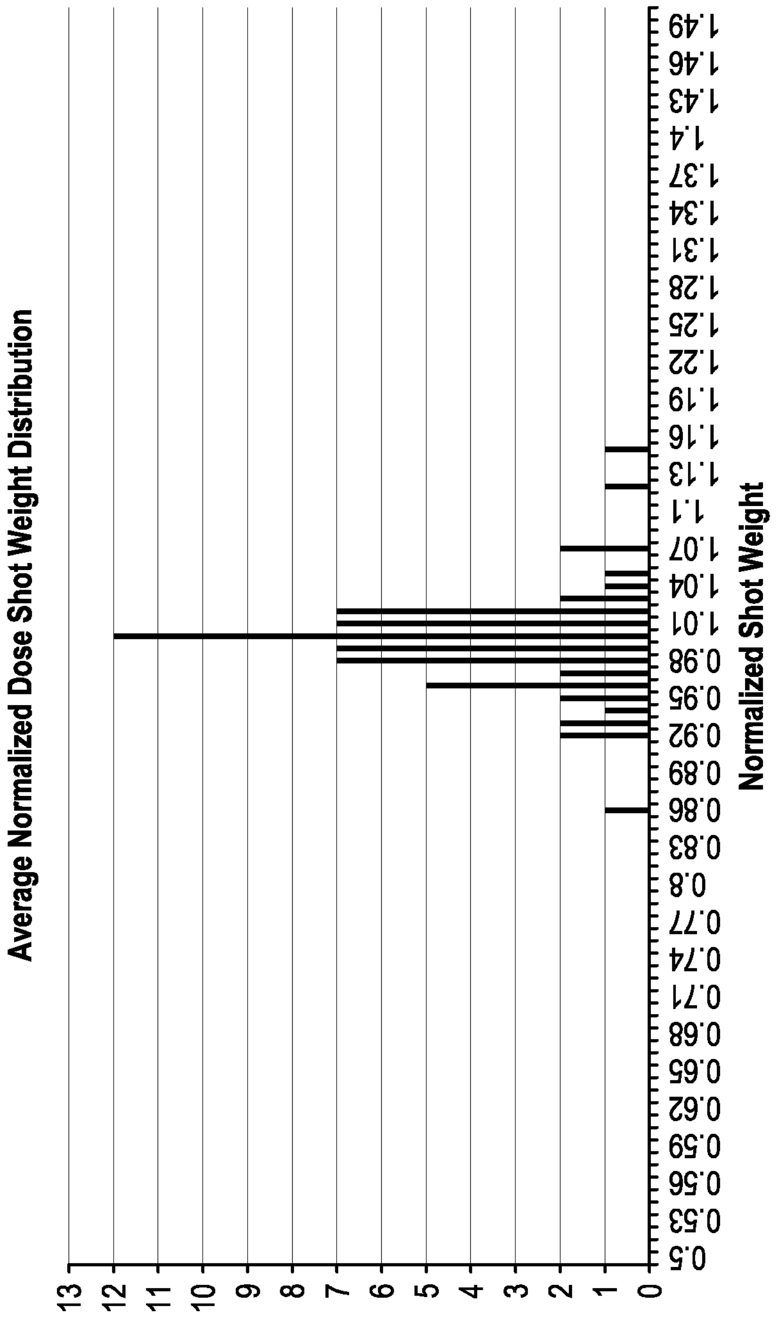
FIG. 5 is a graph showing average normalized shot weight distribution for the one experimental embodiment, consistent with various embodiments of the present disclosure.

FIG. 5 shows an average, normalized shot weight distribution for the tested samples—where the wick is a stainless-steel mesh with diamond-like carbon coating.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS

10 electronic smoking device
12 end cap
14 power supply portion
16 atomizer/liquid reservoir portion
18 light-emitting diode (LED)
20 air inlets
22 battery
24 control electronics
26 airflow sensor
28 atomizer
30 heating coil
32 wick
34 central passage
36 liquid reservoir
38 air inhalation port
200 partial electronic cigarette assembly
205 atomizer chamber
210 heating coil
215 electronic cigarette juice reservoir
220 wick

What is claimed is:

1. A wick for an electronic cigarette comprising:
a non-combustible internal composition; and
a non-conductive coating, wherein the non-conductive coating includes amorphous carbon.

2. The wick of claim 1, wherein the internal composition is a stainless-steel alloy.

3. The wick of claim 1, wherein the wick is a rolled, stainless-steel mesh forming a mesh tube.

4. The wick of claim 1, wherein the internal composition is an aluminum alloy and the coating is an aluminum-oxide.

5. The wick of claim 1, wherein the internal composition is a titanium alloy and the coating is a titanium-oxide.

6. The wick of claim 1, wherein the wick is a titanium mesh made of titanium grade 1, with a wire diameter of 0.01 inches (50 standard wire gauge) and 500 holes-per-inch.

7. The wick of claim 1, wherein the wick is a titanium mesh made of titanium grade 1, with a wire diameter of 0.02 inches (25 standard wire gauge) and 100 holes-per-inch.

8. The wick of claim 1, wherein the wick is configured and arranged to deliver a dosage of 2.5 milligrams of eCig juice, with a deviation of ±15%, in response to a user draw.

9. The wick of claim 1, wherein the wick is configured and arranged to be positioned with an electronic cigarette, the electronic cigarette further including a tank that contain eCig juice, and an atomizer that vaporizes eCig juice into an airflow, and the wick is further positioned in fluid communication between the tank and the atomizer, and draws eCig juice from the tank and deposits the eCig juice on to the atomizer.

10. The wick of claim 9, wherein the non-combustible internal composition of the wick is a conductive material, and the non-conductive coating of the wick is configured and arranged to prevent current draw away from the atomizer during vaporization of the eCig juice.

11. The wick of claim 1, wherein the non-conductive coating a non-conductive material selected from the group consisting of: an amorphous carbon material, titanium oxide, polyamide, and polyparaxylene.

12. The wick of claim 1, further comprising a heating element, wherein the heating element is titanium and the wick is stainless steel, and at least one of the heating element and the wick includes a non-conductive coating, the non-conductive coating configured and arranged to electrically isolate the wick from the heating element.

13. The wick of claim 3, wherein the non-conductive coating of the wick is applied to the non-combustible internal composition by way of vapor deposition coating.

14. The wick of claim 1, wherein the wick is configured and arranged to deliver a dosage of eCig juice between 2.125-2.875 mg per user draw.

* * * * *